(12) United States Patent
Fujiwara

(10) Patent No.: US 6,782,098 B1
(45) Date of Patent: Aug. 24, 2004

(54) PROTECTION CIRCUIT/METHOD FOR SUBSCRIBER TELEPHONE INTERFACE CIRCUIT

(75) Inventor: Yoshinobu Fujiwara, Kamagaya (JP)

(73) Assignee: Uniden Corporation, Tokyo (JP)

(*) Notice: Subject to any disclaimer, the term of this patent is extended or adjusted under 35 U.S.C. 154(b) by 0 days.

(21) Appl. No.: 09/545,138

(22) Filed: Apr. 7, 2000

(51) Int. Cl.[7] .......................... H04M 9/00; H04M 1/00
(52) U.S. Cl. .............. 379/412; 379/413.01; 379/399.01
(58) Field of Search .................. 379/413, 412, 379/413.02, 399.01, 402, 387.01, 401, 404, 392, 392.01, 414, 418, 416, 413.01

(56) References Cited

U.S. PATENT DOCUMENTS

| | | | |
|---|---|---|---|
| 4,947,427 A | | 8/1990 | Rosch et al. ................ 379/412 |
| 5,392,349 A | * | 2/1995 | Elder, Jr. .................... 379/412 |
| 6,188,764 B1 | * | 2/2001 | Huang et al. ............... 379/412 |
| 6,219,417 B1 | * | 4/2001 | Zhou .......................... 379/377 |
| 6,275,583 B1 | * | 8/2001 | Derby et al. ................ 379/412 |
| 6,411,680 B1 | * | 6/2002 | Rousse ........................ 379/21 |
| 6,418,222 B2 | * | 7/2002 | Wong et al. ................ 379/412 |

FOREIGN PATENT DOCUMENTS

| | | | |
|---|---|---|---|
| JP | 63304793 | 12/1988 | ............ H04Q/3/42 |
| JP | 11164467 | 11/1997 | ............ H02H/3/06 |

* cited by examiner

*Primary Examiner*—Rexford Barnie
(74) *Attorney, Agent, or Firm*—Sidley Austin Brown & Wood LLP

(57) ABSTRACT

The present invention provides an improved method of protecting a subscriber telephone interface circuit from the application of excess voltages and currents. The method uses a standard subscriber telephone interface circuit, including a speech circuit and a ringing detection circuit, in conjunction with updated controlling software. When excess voltage or current is detected by the ringing detection circuit, a CPU disconnects the speech circuit. The speech circuit is reconnected when the excess voltage or current is removed. The present invention further provides a ringing detection circuit that connects a speech circuit when a ringing signal is detected, and disconnects the speech circuit when excess voltage or current is detected.

8 Claims, 2 Drawing Sheets

PROTECTION CIRCUIT/METHOD FOR SUBSCRIBER TELEPHONE INTERFACE CIRCUIT

BACKGROUND OF THE INVENTION

1. Technical Field

The present invention relates to a protection circuit for a subscriber telephone interface circuit, and particularly to an improved method and circuit for protecting the telephone interface from the application of excess voltages and currents.

2. Related Art

A subscriber line interface circuit (SLIC) is used in a telephone switching system to interface between the switching system and pairs of wires connected to a telephone terminal device.

In a conventional SLIC, a ringer detection circuit detects a ringing signal sent from a Public Switch Telephone Network (PSTN). The detection of ringing results in a speech circuit being connected across the line, and the ringing detection circuit is no longer required.

Current SLICs contain many sensitive electronic components, particularly in the speech circuit, which are easily damaged by excess voltage or current. The environment in which a SLIC is used means there are many circumstances in which such hazardous excess currents or voltages may be applied to a SLIC. Possible hazards include inappropriately connected power lines, or voltages induced from power lines running adjacent to the telephone line. SLICs are also subjected to rigorous overvoltage tests, during which excess voltages and currents are applied to the SLIC.

It is therefore necessary to protect the SLIC against damage that would otherwise be caused by these excess voltages and currents. It is important that any means of providing protection be cost effective, as the number of SLICs employed in a telephone switching system is very high, specifically, equal to the number of users.

It is common practice to insert a series resistor in the interface circuit to protect against lightning surges, and to conform to testing stipulated in FCC regulations. Unfortunately, it is difficult to set the value and power rating of this resistor as it must satisfy two conflicting requirements. Namely, it must be able to pass prolonged overvoltage tests stipulated in safety standards such as UL1459, while preventing fusing at the time of lightning surges in a controlled manner. This makes it difficult to meet conditions for the series resistor stipulated in the Recommended American Telephone equipment standards (EIA-470).

Many methods are known to offer the necessary protection. Earlier systems employed components such as relays, indictors, transformers, resistors, and fuses, etc., which can withstand stresses resulting from overvoltage. More modern systems, however, employ solid state components such as Zener diodes or thyristors, which are more susceptible to damage.

For instance, Japanese patent laid-open No. Sho. 63-304793 discloses a protection arrangement for a telephone subscriber line interface circuit connected via feed resistors to a telephone subscriber line comprising switching means, voltage sensing means, current sensing means, means for coupling the voltage sensing means to the line and for coupling the current sensing means to the feed resistors, whereby the voltage sensing means is responsive to voltage on the line and the current sensing means is responsive, when the switching means is closed, to current on the line, and control means for closing the switching means in normal operation and for opening the switching means in response to a voltage on the line determined by the voltage sensing means to exceed a predetermined threshold and in response to a current on the line determined by the current sensing means to exceed a predetermined threshold.

In addition, Japanese patent laid-open No. Hei. 11-164467 discloses an overcurrent protection unit which reliably protects a SLIC against overvoltage and overcurrent, provided with a function to detect the abnormal state, and which automatically resets when the overvoltage disappears.

However, both of these inventions employ dedicated components to detect the excess voltage or current state, which inevitably causes an increase in the number of components and thus cost.

SUMMARY OF THE INVENTION

The object of the present invention is therefore to make it possible for a subscriber line interface circuit to prevent heat radiation and ignition when an excessive voltage is applied, such as during testing to conform to American and Canadian safety standards (UL/CSA).

It is also an object of the present invention to provide this protection without the need for a dedicated detection circuit to thereby prevent any increase in the cost of the SLIC itself This is achieved in the present invention by automatically disconnecting a low impedance speech circuit in such an event, so that only a high impedance detection circuit is placed across the line, thus limiting current. The present invention does this by using a detection circuit that is normally used during an on-hook state to detect ringing current indicative of an incoming call. After a speech circuit is switched in, this detection circuit functions to detect excessive voltage applied to the line during the call, and if excessive voltage is detected the speech circuit is disconnected.

DESCRIPTION OF PREFERRED EMBODIMENTS

Figure 2:
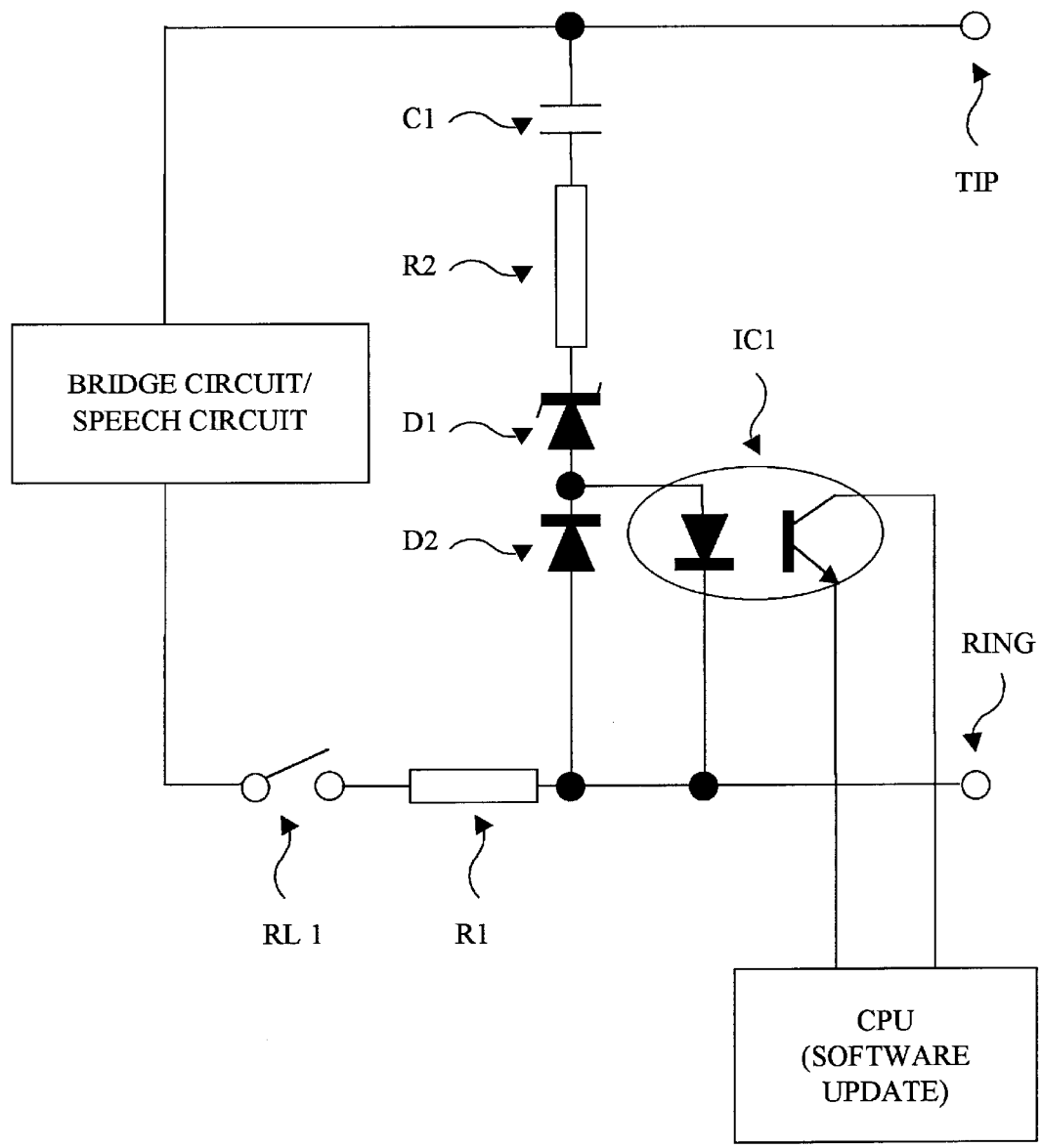
FIG. 2 is a circuit diagram of a SLIC of the present invention

A circuit diagram of a subscriber line interface circuit of the present invention is shown in FIG. 2.

The SLIC comprises a bridge circuit/speech circuit and a ringer detection circuit connected in parallel with each other and across line connection terminals TIP and RING. However, switch contacts of a relay RL1 and a lightning surge protection resistor R1 are also connected in series with the speech circuit.

The ringer detection circuit is made up of a capacitor C1, a resistor R2, a Zener diode D1, a diode D2, and a photocoupler IC1. One end of the capacitor C1 is connected to the TIP terminal and one end of the bridge circuit/speech circuit, the second end of the capacitor C1 is connected to one end of the resistor R2, the second end of the resistor R2 is connected to the cathode of Zener diode D1. The anode of Zener diode D1 is connected to the cathode of diode D2, and one input terminal of the photocoupler IC1. The anode of diode D2 and the second input terminal of the photocoupler IC1 are connected together, and also connected to one end of resistor R1 and to the RING terminal. The output side of the photocoupler IC1 is connected to a CPU.

The second end of resistor RI is connected to one of the switch contacts of relay RL1, with the second switch contact being connected to the other side of the bridge circuit/speech circuit.

In normal operation, the ringer detection circuit detects a ringing signal sent from a PSTN. The detection causes a signal to be sent to the CPU, which then causes a hook relay RL1 to operate and close the contacts of RL1. Therefore, the speech circuit is connected across the line in Off-hook mode. Ringing current is then stopped from the PSTN immediately, and in a conventional SLIC the operation of the ringing detection circuit is completed and is not required again until the interface circuit goes on-hook once the call is completed.

However, in order to conform with FCC part 68, the ringing detection circuit operates at 40–150 Vrms, which means it will still be able to detect excess voltage that is applied as part of safety standards testing. The specific test in this case is overvoltage test M4 as stipulated in the UL standard for safety of telephone equipment, UL1459.

If the detection circuit detects a voltage more than 40 Vrms after the interface circuit has been put in Off-hook mode, this indicates that an excess AC voltage is being applied across the line. The detection circuit will not respond to DC levels because of the capacitor C1. The CPU is programmed such that if such detection is received in Off-hook mode, the CPU causes the speech circuit to be disconnected, to prevent damage by excess current caused by the excess voltage.

Since the speech circuit and the series resistor R1 are to be disconnected 10 seconds after the application of excess voltage testing, there is no longer a requirement for the series resistor R1 to be capable of withstanding these test conditions. Thus, series resistor R1 can more easily be designed for optimum performance during actual faulty overvoltage, such as shorting to power lines while a call is in progress, and to be able to withstand high pulsed energy, such as results from lightning strikes. As there is no danger of the series resistor R1 fusing during test, there is less likelihood of damage to surrounding components.

Figure 1:
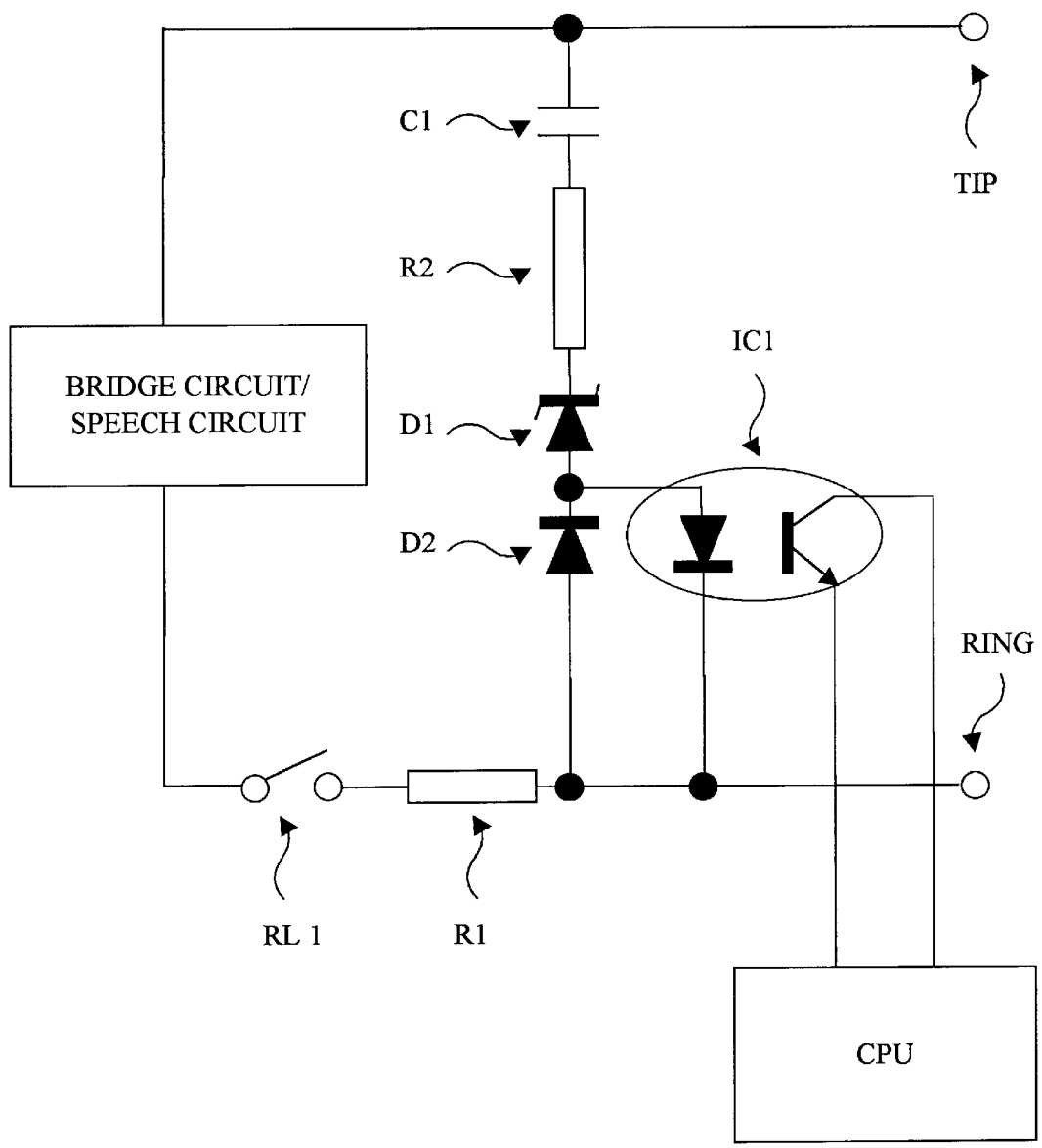
FIG. 1 is a circuit diagram of a SLIC of the related art.

The hardware operation of the SLIC of the present invention is the same as that used in the related art as shown in FIG. 1, but appropriate software for the CPU enables this hardware to be used to perform further functions. There is now increased freedom of design with respect to the resistor R1, as the resistance value and power capacity only have to deal with normal low voltage operation, and fusing in a safe and non-flammable manner upon application of a voltage above 200V. The lightning protection resistor is not required while the bridge circuit/speech circuit is not connected, as the ringing detection circuit is high impedance and so current flowing is much lower, making the ringing detection circuit far less susceptible to damage as a result of high voltage application. Thus, the SLIC can be made to withstand overvoltage test or fault conditions without the need for any additional components whatsoever, and improved functionality is enabled simply through software updates. This is extremely cost effective.

The present invention is not limited to the above structure or the described function of overvoltage detection and protection.

For example, since ringing current is normally disconnected after ten seconds of detection, by suitably structuring the CPU software it is possible to detect that an excess voltage has existed for longer than ten seconds from being in the Off-hook state. The CPU can then forcibly disconnect the relay to prevent prolonged connection of the speech circuit while an excessive voltage is applied in the Off-hook state. This prevents the speech circuit from being connected with excess voltage applied for longer than 10 seconds, which will significantly reduce the likelihood of damage to the speech circuit.

It is also possible, with appropriate software, to detect that an excess voltage has been removed, and to reset the circuit. For example, if the excess voltage is detected during the off-hook state, the speech circuit is disconnected. If the excess voltage is then removed, the CPU can cause the speech circuit to be reconnected.

The CPU can also be made to operate so as to be capable of handling a call-waiting situation. Specifically, in the off-hook state, if another call is detected the subscriber temporarily disconnects the telephone line. After a short pause, the new caller is placed on the line and the speech circuit reconnected. The two callers can be alternated between in a similar manner by repeated activation of the call waiting function, temporarily disconnecting the speech circuit each time. This disconnection of the telephone line would ordinarily cause the voltage on the telephone line to increase. This voltage will be detected by the ringing detector, causing the CPU to disconnect the speech circuit, and thus ending the call. As this is obviously undesirable, the CPU operates by having a 10 second delay to allow the subscriber to perform the call waiting function. This delay is also utilized for a call transfer function, often used in a large office.

Alternatively, the CPU can operate so that if the excess voltage is detected during Off-hook and persists longer than 10 seconds, forced disconnection of the speech circuit is caused, preventing the series resistor R1 from fusing and damage occurring in the telephone. The CPU can keep the speech circuit disconnected as long as the fault condition persists, but reconnects the speech circuit if the fault is cleared.

What is claimed is:

1. A method of protecting a subscriber line interface against overvoltage, the subscriber line interface comprising a speech circuit and a ringing detection circuit, the ringing detection circuit for detecting a voltage in excess of 40 Vrms and for outputting a corresponding detection signal to a CPU, the method comprising the steps of:

detecting a ringing current;
  connecting the speech circuit;
  subsequently detecting an overvoltage;
  executing delay processing for a predetermined time;
  determining whether the overvoltage exists after the predetermined time; and
  disconnecting the speech circuit if the overvoltage is determined to exist after the predetermined time.

2. A method of protecting a subscriber line interface against overvoltage in accordance with claim 1, wherein the predetermined time is 10 seconds.

3. A method of protecting a subscriber line interface against overvoltage in accordance with claim 1, further comprising the steps of:

determining whether the overvoltage exists after the step of disconnecting the speech circuit; and
  reconnecting the speech circuit if the overvoltage is determined not to exist after the step of disconnecting the speech circuit.

4. An apparatus for protecting a subscriber line interface against overvoltage comprising:

a speech circuit for transmitting and for receiving audio signals;

a relay for connecting/disconnecting the speech circuit to a subscriber line;

a ringing detection circuit for detecting a ringing current, for detecting a voltage in excess of 40 Vrms, and for outputting a detection signal; and a CPU for controlling the relay based upon the thus outputted detection signal, wherein if the speech circuit is not connected to the subscriber line and the CPU receives the outputted detection signal the CPU controls the relay to connect the speech circuit to the subscriber line to answer an incoming call, and wherein if the speech circuit is connected to the subscriber line and the CPU receives the outputted detection signal, the CPU executes delay processing for a predetermined time, and if the CPU receives the outputted detection signal after executing delay processing, the CPU controls the relay to disconnect the speech circuit from the subscriber line to protect the subscriber line interface against overvoltage.

5. An apparatus for protecting a subscriber line interface against overvoltage in accordance with claim 4, wherein the predetermined time is 10 seconds.

6. An apparatus for protecting a subscriber line interface against overvoltage in accordance with claim 4, wherein, if after the CPU disconnects the speech circuit from the subscriber line, the outputted detection signal indicates no voltage in excess of 40 Vrms is being detected, the CPU reconnects the speech circuit to the subscriber line.

7. A ringing detection circuit for protecting a subscriber line interface against overvoltage wherein when the ringing detection circuit detects a ringing current and a speech circuit is not connected to a subscriber line, the ringing detection circuit connects the speech circuit to the subscriber line to answer an incoming call, and when the ringing detection circuit detects a voltage in excess of 40 Vrms for a predetermined time and the speech circuit is connected to the subscriber line, the ringing detection circuit disconnects the speech circuit from the subscriber line to protect the subscriber line interface against overvoltage.

8. A ringing detection circuit for protecting a subscriber line interface against overvoltage in accordance with claim 7, wherein the predetermined time is 10 seconds.

* * * * *